United States Patent [19]
Knapp

[11] 3,901,316
[45] Aug. 26, 1975

[54] ASPHALT PLUG EMPLACEMENT PROCESS
[75] Inventor: Randolph H. Knapp, Houston, Tex.
[73] Assignee: Shell Oil Company, Houston, Tex.
[22] Filed: Aug. 13, 1974
[21] Appl. No.: 497,011

[52] U.S. Cl. .............................. 166/250; 166/294
[51] Int. Cl.² ...................................... E21B 33/138
[58] Field of Search ............... 166/294; 175/65; 252/8.5 P

[56] References Cited
UNITED STATES PATENTS

| | | | |
|---|---|---|---|
| 2,378,235 | 6/1945 | Miles | 166/294 |
| 2,380,156 | 7/1945 | Dobson et al. | 252/8.5 P |
| 3,159,976 | 12/1964 | Brandt et al. | 166/294 |
| 3,168,920 | 2/1965 | Barrett | 166/294 |
| 3,472,319 | 10/1969 | McAuliffe | 166/294 |
| 3,528,914 | 9/1970 | Darley | 252/8.5 P |
| 3,730,272 | 5/1973 | Richardson et al. | 166/294 |
| 3,830,299 | 8/1974 | Thomeer | 166/250 |

FOREIGN PATENTS OR APPLICATIONS
552,041   1/1958   Canada............................ 252/8.5 P Primary Examiner—Stephen J. Novosad
Assistant Examiner—George A. Suckfield
Attorney, Agent, or Firm—Harold W. Coryell

[57] ABSTRACT

A process for plugging a subterranean earth formation by injecting an asphalt-containing emulsion is improved by a cationic emulsifier and a pH increasing reactant that induces the breaking of the emulsion in response to a time-temperature exposure of selected extent.

6 Claims, 2 Drawing Figures

A  #35 ASPHALT EMULSION WITH 3.25 lb/BBL SODIUM CYANATE

DALWORTH #1 EMULSIONS CONTAINING:
B  1.5 GAL/BBl P.O., 2.25 BBl/BBl BRINE
C  2     "    ,    "      "
D  3     "    ,    "      "
E  3     "    , 0.75 BBl/BBl BRINE

ASPHALT PLUG EMPLACEMENT PROCESS

BACKGROUND OF THE INVENTION

The invention relates to a process for decreasing the permeability of a permeable subterranean earth formation. More particularly, it relates to plugging pores located within the first few inches of the portion of an earth formation that is encountered by the bore hole of a well, and provides a means for doing so in earth formations that are relatively highly permeable and/or fractured.

The positioning of a plugging material within the first few inches of an earth formation is particularly valuable for use in the injectivity profile improving process of the coassigned copending patent application by J. H. Thommer, Ser. No. 362,624, filed May 21, 1973, now U.S. Pat. No. 3,830,299. In that process, variation with depth in the fluid flow pattern of a well is determined, the first few inches of all permeable portions of the surrounding earth formations are plugged, and then at least some of the plugged portions are perforated with openings that are sized and located to provide selected rates of flow at selected depths.

Both the utility of plugging a subterranean earth formation and various ways of doing it with an asphalt emulsion were previously known. In 1933 the application for U.S. Pat. No. 2,201,459 described the use of aqueous dispersions of asphalt in an aqueous liquid which contained an acid soap-type emulsifying agent and a pH reducing reactant, such as methyl formate to cause the emulsion to break. The T. K. Miles Patent 2,378,235 describes the relatively incomplete breaking of such emulsions and a procedure for improving that problem, by dissolving a cationic surfactant in the asphalt so that it migrates to the surface of the droplets and subsequently causes their coagulation. U.S. Pat. No. 3,026,266 describes asphalt emulsions in which the tendency of the asphalt to stick to siliceous materials is improved by using cationic surfactants as emulsifiers and polyamide condensation products of polymerized acids and polyamines as modifiers. U.S. Pat. No. 3,159,976 describes an earth formation plugging process for avoiding the slow breaking tendancy of such cationic asphalt emulsions, by separately injecting the emulsion and a strong base to mix in or near the zone to be treated and cause a quick coalescence of the asphalt particles. The H. J. Sommer and W. C. Simpson U.S. Pat. No. 3,324,041 describes a polyepoxide-containing asphalt emulsion in which emulsions of both a polyepoxide and a nonionic surfactant are mixed to form a composition which is subsequently solidified by an interaction of the polyamide and the polyepoxide.

SUMMARY OF THE INVENTION

The present invention relates to an improved process for plugging a permeable earth formation by injecting into it an oil-in-water emulsion in which asphalt is dissolved or suspended in the oil-phase and the emulsifier is, at least predominately, a cationic surfactant. The composition and concentration of the asphalt-containing oil-phase and the cationic emulsifier are arranged so that, in the emulsion, the suspended particles (droplets and/or solids) are sufficiently small and well dispersed to flow through the pores of the earth formation to be treated, the pH is relatively near neutral, and the emulsion breaks when the pH is increased. A pH increasing reactant is dissolved in the aqueous phase of the emulsion and its composition and concentration are correlated with the properties and location of the earth formation to be treated so that the pH of the emulsion is increased to one at which the emulsion breaks after the emulsion has at least substantially reached the earth formation to be treated.

DESCRIPTION OF THE INVENTION

Figure 1:
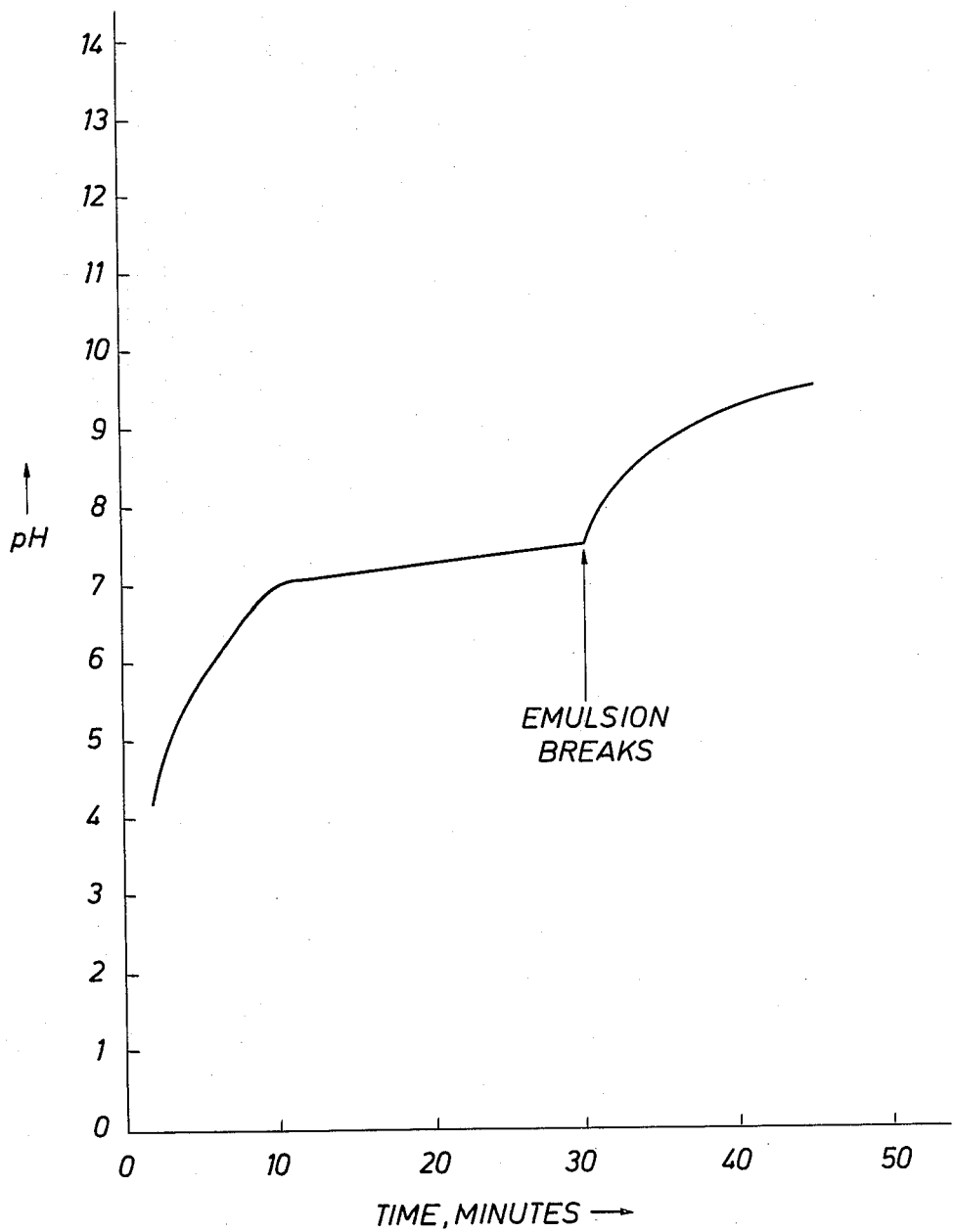
FIG. 1 shows a plot of the variation with time in the pH of the cationic emulsion containing a pH increasing reactant.

The present invention is, at least in part, premised on the following. As the pH of a cationic emulsion is increased from a near neutral value at which it is stable to a value in or near the basic range, the emulsion becomes destabilized and breaks. The pH at which the break occurs is influenced by the composition and concentration of the emulsifier and the asphalt-containing oil phase of the emulsion. For example, a surface-active quaternary ammonium salt may retain its cationic activity to a pH from about 8 or 9, while a surfactant salt of a diamine may lose its protons (and thus lose its cationic emulsifying capability) at a pH of around 4 or 5. The stability of a cationic asphalt emulsion can be affected by the action of a pH increasing reactant in a manner such that the reactant can be used to break the emulsion in response to a time-temperature exposure that is attainable in flowing an emulsion from a surface location at which it is compounded to a subsurface permeable earth formation into which the emulsion is injected. And, when a cationic asphalt emulsion is caused to break by an increase of its pH, the asphalt particles tend to agglomerate and cling to each other and the walls of pores or fractures within an earth formation. When an emulsion is being injected into an earth formation to be plugged, it is preferable that the emulsion break after it has at least substantially reached the earth formation to be treated. An earlier breaking tends to plug only the face of the formation, rather than forming a plug within the formation. A later breaking tends to require a longer shut-in time (after the treatment has been substantially completed) but does not prevent the formation of an interval plug.

The pH increasing reactant used in the present process can be substantially any water-soluble compound or mixture of compounds that react in a time and temperature controlled manner and produce a water soluble material that increases the pH of an aqueous solution. Such a reactant may comprise a mixture of a water soluble epoxide, such as propylene oxide, and a water-soluble chloride, such as sodium chloride; in which case the following reaction occurs:

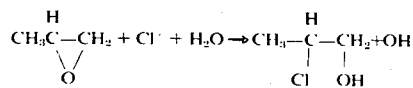

The pH-increasing reactant may compromise a water soluble cyanate, such as sodium cyanate; in which case the following reaction occurs:

$$CNO^- + 2H^+ + H_2O \rightarrow CO_2 + NH_4^+$$

A pH-increasing reactant that is particularly suitable where the temperature of the earth formation to be treated is above about 160°F, compromises a mixture of a water-soluble nitrite salt, such as sodium nitrite, and a water soluble amide of carbonic acid, such as urea, in which case the following reaction occurs:

$$2NO_2^- + 2H_2O \rightarrow 2HNO_2 + 2OH^-$$
$$2HNO_2 + CO(NH_2)_2 \rightarrow 3H_2O + 2N_2 + CO_2$$
$$2NO_2^- + CO(NH_2)_2 \rightarrow H_2O + 2N_2 + CO_2 + 2OH^-$$

In general, the pH-increasing reactant can compromise a water soluble amide of carbamic or carbonic acid such as ammonium carbonate or urea, or their homologs, salts of cyanic acid, such as alkali metal cyanates, cyanamide, etc.

The asphalts (or bituminous materials) used in the present invention can be substantially any such pyrogeneous distillate or tars composed mainly of hydrocarbons with small amounts of sulphur, nitrogen, oxygen or the like substituents. Such materials can include the bituminous materials described in Abrams Asphalt and Allied Substances, Volume 1, page 57, Fifth Edition. Particularly suitable materials are straight run asphalts having penetration values of from about 40 to 300 and softening points in the range from about 95° to 145°F. Asphalt cutbacks such as a 150 penetration grade asphalt cut with 5% to 20% diesel oil, or other oil solvent, are particularly suitable.

It is preferable that the asphalt or asphalt cutback softening point and viscosity be properly selected to enhance the tendency for shallow matrix plugging. Tests with Berea cores having as much as several hundred millidarcy permeability indicate that, in order to obtain penetration of the asphalt into the core and effective plugging, the cutback should be considerably above its softening point at the treatment temperature. For example, at a treatment temperature of 140°F, a 120–150 penetration grade asphalt cutback with 5% by weight of diesel oil penetrated a 160 millidarcy Berea core for about 1 inch. On the other hand, a similar cutback at a treatment temperature of 70°F only penetrated a 129 md Berea core about 1/8 inch. The five percent cutback had a ring and ball softening point of 86°F so that at a treatment temperature of 70°F, the asphalt is below, while at 140°F, it is considerably above its softening point. At 140°F such a cutback is an effective plugging material having a viscosity of about 100,000 centipoise. In general, since the asphalt can be softened by the addition of an oil solvent (such as diesel oil) after the emulsion has been compounded, it is preferable to start with an emulsion containing a relatively hard asphalt (e.g. one having a softening point likely to be near or above the temperature of the earth formation to be treated) and then softening the asphalt to the extent required by adding an oil solvent to the emulsion. The asphalt concentration of the emulsions can vary relatively widely, for example, from about 5–75 percent by weight of asphalt. A viscosity convenient for pumping is obtained by having a concentration in the range of 40 to 65 weight percent asphalt.

The aqueous liquid used in the present invention can be substantially any that is compatible with the emulsifier and pH increasing reactant. In general, a relatively low salt content and relatively soft water, is preferred. A small but significant concentration of a soluble calcium salt such as calcium chloride is advantageous in increasing the stability of the emulsion (prior to the addition of the pH increasing reactant). Suitable concentrations of calcium chloride range from about 0.1 to 0.25 percent by weight of the aqueous liquid. The emulsions of the present invention have a good tolerance to dilution with brine. For example, the emulsion formulation No. 35 (see Table 1) can be diluted with the synthetic brine of Table 2 to provide a stable emulsion containing only about 10% hydrocarbon.

The cationic emulsifier can be substantially any surface-active cationic material such as the surface-active salts of amines and quaternary ammonium salts. Suitable surface active cationic emulsifiers are commercially available, such as: the Arosurf AA emulsifiers from Ashland Chemical Company; the Redicote E emulsifiers from Armak Chemical Company; the Aliquat fatty quaternary ammonium chlorides, or the Diam fatty diamines from General Mills Chemical Company; the Nalquats, quaternary imidazoline bases, from Melco Chemical Company; the Arquads, alkyl trimethyl ammonium chlorides, from Armak Chemical Co.; the Emcols, substituted triethyl ammonium chlorides from Emulsol Corporation; the Redicote E-5 Emulsifier, or other quaternary ammonium salts such as Arosurf AA-22 or AA-57, are particularly preferred. Such quaternary ammonium salts provide cationic emulsions that are (in the absence of the pH increasing reactant) relatively stable at near neutral pH's such as from about 4 to 8.

Where the earth formation to be treated contains relatively large pores and/or fractures, particulate materials, (preferably having sizes ranging from relatively very fine particles to particles having sizes equalling at least about 1/3 the effective diameters of the pores to be plugged) can be suspended in the present emulsion. Suitable suspended particles can be silica, rubber, carbonate, asphaltic or the like particles having sizes ranging from less than about ten microns to more than about two thousand microns. The capability of the emulsion to retain such solids in suspension can be enhanced by viscosifying the aqueous phase of the emulsion with a water soluble cellulose ether, such as hydroxyethyl cellulose ether. Particularly suited is the hydration retarded grade of HEC available from Hercules Chemical as Natrosol 250 H.R. This material is easily dispersed at pH's in the range of 2 to 5. Unretarded HEC can be dispersed in the asphalt emulsion by first making a paste of the HEC in diesel oil. Thickening of the emulsion is greatly enhanced by increasing the pH to 6.5 to 7.5 after dispersing the polymer. Granular asphalt gillsonite particles and/or a crumb rubber particles having a wide range of particles size distribution are particularly suitable. Such particles are commercially available in sizes ranging from 100 microns or less to over 4,000 microns or about 3/16 inch in size. A granular asphalt is available from Oil Base, Inc. under the trade name "FormaSeal" or from Halliburton as Gillsonite. Rubber crumbs are available from B. F. Goodrich Co. as Amerpol 1006. Tests with berea cores through which holes having diameters of 1,000 microns were drilled indicated that such pores can be plugged to a pressure of 1,000 pounds per square inch by using the present type of asphalt emulsion and a 5050 mixture of granular asphalt and rubber crumbs to provide a total concentration of 0.5 lbs. solids per gallon of emulsion.

The initial break time (IBT), i.e., the time at a given temperature which provides a time-temperature exposure that causes the pH increasing reactant to raise the pH of the emulsion to one in which the emulsion breaks, is dependent upon numerous factors. For emulsions containing a given pH increasing reactant, the IBT varies with both the composition and concentration of the asphalt and/or suspended solids. The severity of the time-temperature exposure of a given emulsion depends on the temperature of the formation to be treated and the rate at which fluid is to be injected into that formation. Where it is desirable to shorten the IBT time, for example in treating a relatively shallow formation, the pH of the emulsion can be increased by adding one or more water soluble bases (such as an alkali metal hydroxide, or carbonate, or the like) until the pH is just slightly below the pH at which the emulsion breaks. This ensures a relatively quick attainment of the emulsion breaking pH by the action of the pH increasing reactant. Alternatively, the temperature of the near borehole portion of the earth formation and/or the conduits extending between the emulsion compounding location and that formation to be treated, can be altered by injecting a relatively hot or cool fluid. When shallow wells are being treated so that very short IBT's are required (e.g. 5–15 minutes), the pH can be increased to near the point of emulsion instability by the addition of caustic just prior to injecting the emulsion. In a well mixed tank, the amount of caustic required can be judged by observing the trail of asphalt formed as the caustic is poured onto the surface of the emulsion. Alternately, the caustic can be mixed in line either at the well head or down hole by simultaneous injection of emulsion and caustic solution.

For treatment of "vacuum" wells, determinations can be made of the bottom hole pressure (by means of a downhole pressure gauge or measurements of the fluid column in the well, or the like), in order to follow the plugging process. Where positive surface injection pressure is needed to inject fluid, the emulsion being injected is maintained at a selected monitored moderate injection pressure to ensure that the injection pressure is kept below the fracturing pressure of the formation. This can be readily accomplished by use of a by-pass flow loop containing a pressure relief valve which is set to open at a pressure below the fracturing pressure of the formation. Once the well has been plugged to injection at this pressure it must be reperforated before attempting to establish the desired injection rate into the well.

EXAMPLES

A series of laboratory tests were conducted using a cationic asphalt emulsion with a P. O. (propylene oxide) breaker system and bridging solids to plug a 0.040-inch or 0.070-inch diameter hole which were drilled through 1.75- or 2.00-inch long Berea cores. Such a "large pore" through the core perhaps represents the type of permeability to be plugged in a fractured or extremely permeable earth formation.

A cationic asphalt Emulsion No. 35 is described in Table 1. It contains 20 percent diesel oil in the hydrocarbon phase. Emulsion No. 35-C is a similar formulation with the hydrocarbon phase containing only ten percent diesel oil.

TABLE 1

| CATIONIC ASPHALT EMULSION FORMULATION NO. 35 | |
|---|---|
| Two percent Armak Chemical Co. E-5 Emulsifier (Quaternary Amine) | 2 drums E-5 |
| 65 percent Hydrocarbon | |
| 120–150 Penetration grade asphalt | 52 drums asphalt |
| cut back with 20 percent diesel oil | 13 drums diesel oil |
| 35 percent aqueous phase | 33 drums water |
| | 100 drums total |
| 0.5 lb/drum CaCl$_2$ (0.1 wt. %) | 50 lb CaCl$_2$ |

In the tests in which the asphalt emulsion was allowed to break in response to a time-temperature exposure (rather than the slower-occurring adsorption on the rocks), three gals/bbl of propylene oxide (P. O.) was used as a breaker. At a one bbl/bbl emulsion of brine dilution, the break time at room temperature is about 1 hour. The brine used for dilution or brine flow was the Synthetic Brine described in Table 2.

TABLE 2

SYNTHETIC BRINE

| Salt | MW | gm/liter | mole/liter | Cation MW | Cation mg/l | Cation Field Brine Analysis mg/l | Anion MW | Cl$^-$ mg/l | SO$_4^=$ mg/l |
|---|---|---|---|---|---|---|---|---|---|
| NaCl | 58.46 | 76.098 | 1.3017 | 23 | 29,939 | 29,941 | 35.46 | 46,154 | |
| CaCl$_2$ | 110.9 | 12.088 | 0.1090 | 40 | 4,360 | 4,360 | 35.46 | 7,730 | |
| MgCl$_2$ | 95.22 | 6.088 | 0.0639 | 24.32 | 1,554 | 1,555 | 35.46 | 4,531 | |
| FeSo$_4$ | 151.9 | 0.057 | 0.000375 | 55.85 | 21 | 21.1 | 96.066 | | 36 |
| | | | | TOTALS | 35,874 | 35,877 | | 58,415 | 36 |
| | | | Field Brine Analysis | | 35,877 | | | 58,271 | 35 |

The cores used in these tests were Berea sandstone cores with dimensions, 1-inch diameter X 1.75- or 2.00-inch length. They were bonded into a 5-inch long lucite core holder (which allowed observation of the fluid at the core face of e.g., emulsion, aqueous phase of broken emulsion, or hydrocarbon phase of broken emulsion). In this series of tests, a 0.040-inch diameter or 0.070-inch diameter "large pore" was drilled through the center of the core along its long axis. Such a core represents either a zone extreme matrix permeability or a fractured zone.

In test 1, the core with the 0.040-inch pore had an initial brine permeability of about 8200 md. After allowing the brine diluted emulsion containing P. O. to contact the core for one hour while the emulsion broke, a pressure of 20 psi was applied to the core with brine. The apparent permeability of the core to brine with asphalt in the pore was about 76 md. However, the 20 percent diesel oil cutback was extruded through the pore and after flushing the core face with brine and, on flowing brine through the core, the permeability was restored to a 5500-md value.

In test 2, H. T. Formaseal (Granular asphalt, Oil Base, Inc.) at a concentration of one lb/gal was added to the emulsion prior to diluting it with the P. O. and brine. The particle size of the granular asphalt was less than 32 mesh (0.0195 inch) so that they would readily bridge on the pore. The initial brine permeability of the core was 5000 md. After the hydrocarbon phase of the broken emulsion hit the core face, the core appeared to be completely plugged when 20 psi was applied with brine for 20 minutes. No flow was observed in an additional 15 minutes at 40 psi and then 80 psi. Even after the core face was flushed with brine, the core appeared completely plugged to 80 psi over a period of 20 minutes. However, it is possible that over a longer exposure to brine pressure, the plug would have extruded out of the pore.

In the first run of test 3, the emulsion No. 35-C, containing the harder ten percent diesel oil cutback, was used. This emulsion plugged the 0.040-inch pore completely at 20 psi for 1.5 hours. The initial permeability of the core with the large pore drilled through was 5500 md. The core remained plugged after increasing the pressure to 40 psi for 15 minutes and then to 80 psi for 20 minutes. After flushing the emulsion off the core face with brine, a pressure of 20 psi finally broke the emulsion plug. However, the final brine permeability of the core was only 35 md compared to the initial value of 5500 md. It should be mentioned that the emulsion penetrated into the matrix at the core face surrounding the large pore and that the final permeability value was less than the core permeability without the large pore.

In the second run of test 3, the No. 35-C emulsion was allowed to break on the core face utilizing the P. O. breaker system. At 20 psi the aqueous phase of the broken emulsion was displaced through the previously impaired core at a permeability of about 50 md. When the hydrocarbon phase of the broken emulsion reached the core face, the core was again completely plugged. After 20 minutes at 20 psi, the pressure was raised to 40 psi and then 80 psi for another 20 minutes at each pressure level. The core remained completely plugged by the hydrocarbon phase of the broken emulsion. After the asphalt had been flushed off the core face with brine, the brine permeability at 20 psi was 13 md. This degree of impairment of the core containing a 0.040-inch diameter pore is taken as a favorable indication of the plugging effectiveness of the emulsion system.

A series of attempts to plug a 0.070-inch pore drilled through 1-inch diameter X 2.00-inch long Berea cores mounted in lucite core holders as in the previous tests. The 120–150 PEN grade asphalt without diesel oil added was observed to extrude through this size pore at 50 psi. However, with one lb/gal of either H. T. Formaseal or Ameripol No. 1006 (rubber crumbs, B. F. Goodrich Chemical Company), the 0.070-inch pore was plugged to 120 psi prior to flushing the core face with brine. In the case of the tests with H. T. Formaseal, the plug was not obtained with concentrated emulsion and bridging solids, but was obtained when the emulsion containing H. T. Formaseal was broken by P. O. In the case of the test with Ameripol No. 1006 rubber crumbs, the plug was obtained with the bridging solids in the concentrated emulsion. Neither of these plugs was completely effective. The rubber crumb plug extruded through the 0.070-inch pore at 120 psi after being shut in overnight. The granular asphalt plug was significantly removed by flushing the core face with brine indicating that the placement of the solids had been only near the pore throat opening.

In order to obtain more even dispersion of the granular solids so that they would be carried further into the pore, the emulsion was viscosified with hydroxyethyl cellulose ether (HEC). Guar gum was not effective in viscosifying the cationic asphalt emulsion. Large clumps of gel formed in the aqueous phase at a guar gum concentration of one percent (Basis aqueous phase). An attempt to cross link guar gum in the emulsion with sodium borate at a 0.25 percent concentration (basis aqueous phase) resulted in the emulsion breaking. The Fann viscosity obtained with HEC at 2.5 lbs/bbl in the concentrated asphalt emulsion is shown in Table 3.

TABLE 3

FANN VISCOSITY OF CATIONIC
ASPHALT EMULSION WITH 65 PERCENT HYDROCARBON PHASE
OF 120–150 PEN ASPHALT CONTAINING TEN PERCENT DIESEL OIL
WITH OR WITHOUT HEC VISCOSIFIER AT 2.5 LBS/BBL.

| Fann Reading | 2 | 3 | 100 | rpm 200 | 300 | 600 |
|---|---|---|---|---|---|---|
| Without HEC | 2 | 3 | 48 | 85 | 130 | 247 |
| With HEC | 35 | 54 | 238 | 300+ | 300+ | 300+ |

In order to prevent extrusion of the soft rubber crumbs while taking advantage of their pore filling deformability, a 50—50 mixture of the rubber crumbs and the granular asphalt was added at a total concentration of one-half lb/gal to the HEC viscosified emulsion. This emulsion plugged the 0.070-inch pore to 120 psi brine pressure even after flushing the core face with brine. The plug was tested at pressures of 20, 40, 80, and 120 psi for 1 hour at each pressure on each of three successive days. The plug finally broke at 120 psi on the third day. It is felt that the performance of this plugging formulation under laboratory conditions indicates that it should plug rather large fractures under field conditions. Although the P. O. breaker system was not used with the viscosified emulsion, the system is compatible and could be used.

In a similar test utilizing a high pressure Hassler core holder rather than the lucite mounted cores, a plug of a 0.04 inch diameter core formed at a differential pressure of 1000 psi with a viscosified asphalt emulsion containing ¼ lb/gal Ameripol 1006 rubber crumbs held up to the following test after flushing the core face with brine.

1 hour @ 200 psi — no flow
1 hour @ 400 psi — no flow
1 hour @ 800 psi — no flow
10 min @ 1000 psi — no flow until plug broke The typical pH-time curve for the propylene oxide breaker system is shown in FIG. 1. The emulsion contained 63 percent of an MC-800 cutback (150–175 penetration grade asphalt, from Bell Refining Co., Ardmore, Oklahoma) containing 20 percent kerosene. The emulsifier was a quaternary amine, Armak E-5 at a concentration of two percent basis total emulsion. In addition, the emulsion contained 0.1 weight percent $CaCl_2$ for storage stability. This is a chloride ion concentration of about 640 mg/liter.

For the test of FIG. 1, the equivalent three gallons of propylene oxide was added to one barrel of concentrated emulsion and then this was added to 2.25 barrels of synthetic brine, the composition of which is given in Table 2. The pH then was determined as a function of time as shown in FIG. 1. The curve is essentially a titration of the cationic emulsifier in the emulsion. The relatively flat portion of the curve, between 10 and 30 minutes, shows the buffering effect of the emulsifier. At the point at which the pH begins to increase beyond this plateau, the emulsifier has been neutralized by the generated hydroxyl ion and the emulsion breaks. This time is referred to as the initial break time (IBT) for the system. A series of these tests was run at temperatures from 80° to 140°F and the IBT as a function of temperature is shown as the lower line on a semilog plot in FIG. 2. For this system, the IBT is reduced by one-half for each 13°F increase in temperature. The IBT is quite short at higher temperatures being only about 1 minute at 140°F.

Figure 2:
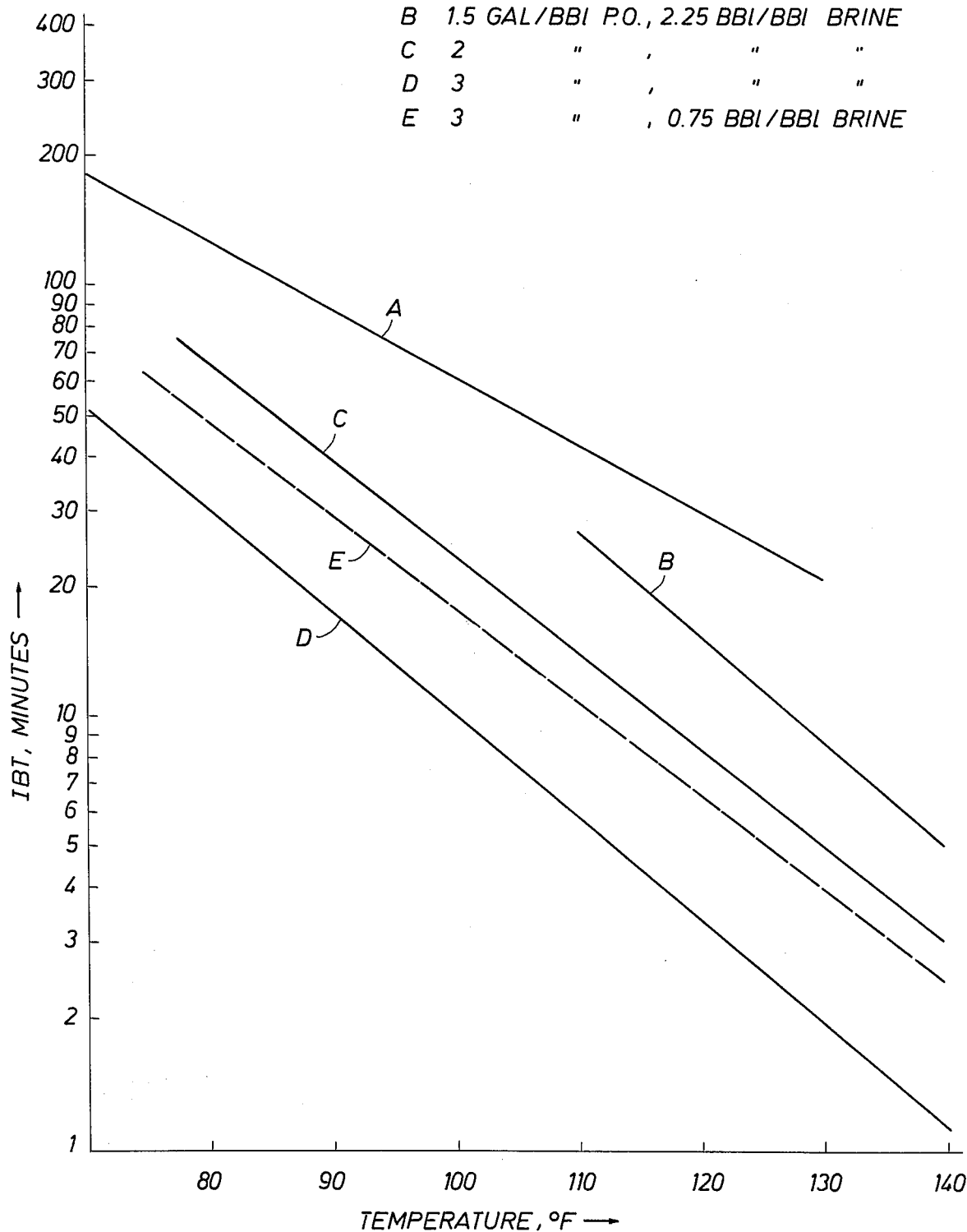
FIG. 2 shows a plot of the variation with temperature of the duration of the stability of cationic emulsions containing pH increasing reactant.

Decreasing the P. O. concentration increases the IBT, as might be expected. The two higher solid lines on FIG. 2 are IBT-temperature lines for P. O. concentrations of two gals/bbl and 1.5 gal/bbl. At 80°F, the IBT with two Gals/bbl P. O. was about 60 minutes. However, at 1.5 gal/bbl P. O., the emulsion did not break at temperatures below 110°F evidently due to the fact that the P. O. was depleted by the hydrolysis reaction before the pH could increase sufficiently to break the emulsion.

What is claimed is:

1. In a process in which a permeable earth formation is plugged by injecting an oil-in-water emulsion in which asphalt is dissolved or suspended in the oil-phase and the emulsifier is a cationic surfactant, the improvement which comprises:

correlating the composition and concentration of said asphalt-containing oil-phase and cationic emulsifier so that the emulsion (a) contains dispersed particles that are small enough and well enough suspended to flow through pores of the earth formation to be treated, (b) has a pH that is relatively near neutral and (c) breaks when the pH is raised by a significant amount; and dissolving, in the aqueous liquid component of the emulsion, a pH-increasing reactant having a composition and concentration that are correlated with the temperature and location of the earth formation to be treated so that the pH of the emulsion is increased to one at which the emulsion breaks after the emulsion has at least substantially reached the earth formation to be treated.

2. The process of claim 1 in which the asphalt-containing oil-phase and cationic emulsifier and aqueous liquid are mixed prior to dissolving the pH-increasing reactant in the aqueous liquid-phase of the emulsion.

3. The process of claim 2 in which the asphalt has a penetration grade between 40 and 300 and a softening point of about 95° to 145° F.

4. The process of claim 3 in which the asphalt is softened by adding sufficient oil solvent to provide a softening point near but less than the temperature of the earth formation to be treated.

5. The process of claim 1 in which the emulsifier is a surface-active quaternary ammonium salt capable of forming an emulsion that is relatively stable at a pH from about 4 to 8.

6. The process of claim 1 in which the emulsifier is a surface-active diamine salt capable of forming an emulsion that is relatively stable at a pH from about 2 to 4.

* * * * *